(12) United States Patent
Oh et al.

(10) Patent No.: US 8,876,384 B2
(45) Date of Patent: Nov. 4, 2014

(54) HYDRODYNAMIC BEARING ASSEMBLY

(75) Inventors: Jong Ryeol Oh, Suwon (KR); Ho Kyung Jang, Suwon (KR)

(73) Assignee: Samsung Electro-Mechanics Co., Ltd., Suwon-Si (KR)

( * ) Notice: Subject to any disclaimer, the term of this patent is extended or adjusted under 35 U.S.C. 154(b) by 21 days.

(21) Appl. No.: 13/572,096

(22) Filed: Aug. 10, 2012

(65) Prior Publication Data

US 2013/0044970 A1    Feb. 21, 2013

(30) Foreign Application Priority Data

Aug. 19, 2011 (KR) .................. 10-2011-0082977

(51) Int. Cl.
*F16C 32/06* (2006.01)
*F16C 41/00* (2006.01)
*F16C 17/10* (2006.01)

(52) U.S. Cl.
CPC .............. *F16C 17/102* (2013.01); *F16C 41/008* (2013.01)
USPC ........................................................ 384/107

(58) Field of Classification Search
USPC ................................... 384/100, 107
See application file for complete search history.

(56) References Cited

U.S. PATENT DOCUMENTS

| 5,141,338 A | * | 8/1992 | Asada et al. .................. 384/114 |
| 5,407,281 A | * | 4/1995 | Chen ............................. 384/107 |
| 5,847,479 A | * | 12/1998 | Wang et al. .................... 310/90 |
| 6,126,320 A | * | 10/2000 | Ichiyama ...................... 384/112 |
| 6,364,532 B1 | * | 4/2002 | Yoshikawa et al. ........... 384/107 |
| 2001/0001269 A1 | | 5/2001 | Asai |
| 2005/0025405 A1 | | 2/2005 | Tamaoka |

FOREIGN PATENT DOCUMENTS

| JP | 2000-46057 | 2/2000 |
| JP | 2001-339905 | 12/2001 |
| JP | 2003-343548 | 12/2003 |
| JP | 2006-38211 | 2/2006 |
| JP | 2007-183000 | 7/2007 |

OTHER PUBLICATIONS

Korean Office Action issued Jul. 1, 2014 in corresponding Korean Patent Application No. 10-2011-0082977.

\* cited by examiner

*Primary Examiner* — Thomas R. Hannon

(57) ABSTRACT

A hydrodynamic bearing assembly includes a shaft; a sleeve having a shaft hole formed therein so that the shaft is rotatably inserted thereinto; and first and second dynamic pressure generation grooves provided in at least one of an outer surface of the shaft and an inner surface of the sleeve and having a herringbone pattern including V-shaped portions in which upper and lower wings are provided to generate dynamic pressure in lubricating fluid filling a bearing clearance between the shaft and the sleeve at the time of rotation of the shaft. The first dynamic pressure generation groove has a V-shaped portion of which an upper wing is longer than a lower wing, and the second dynamic pressure generation groove is disposed below the first dynamic pressure generation groove in an axial direction and has a V-shaped portion of which a lower wing is longer than an upper wing.

5 Claims, 3 Drawing Sheets

HYDRODYNAMIC BEARING ASSEMBLY

CROSS-REFERENCE TO RELATED APPLICATIONS

This application claims the priority of Korean Patent Application No. 10-2011-0082977 filed on Aug. 19, 2011, in the Korean Intellectual Property Office, the disclosure of which is incorporated herein by reference.

BACKGROUND OF THE INVENTION

1. Field of the Invention

The present invention relates to a hydrodynamic bearing assembly.

2. Description of the Related Art

A hard disk drive (HDD), an information storage device, reads data stored on a disk or writes data to a disk using a read/write head.

The hard disk drive requires a disk drive device capable of driving the disk. In the disk drive device, a small-sized spindle motor is commonly used.

The small-sized spindle motor may use a hydrodynamic bearing assembly. A lubricating fluid is interposed between a shaft and a sleeve of the hydrodynamic bearing assembly, such that the shaft is supported by fluid pressure generated in the lubricating fluid.

At the time of initial spindle motor operation, the lubricating fluid concentrated on a dynamic pressure generation groove may have high pressure and low pressure regions along a circumference of the shaft, such that the shaft may fluctuate, thereby causing vibrations and noise.

Therefore, a method of reducing the generation of vibrations and noise at the time of initial motor operation has been demanded.

SUMMARY OF THE INVENTION

An aspect of the present invention provides a hydrodynamic bearing assembly capable of reducing vibrations and noise generated in a spindle motor by preventing high pressure and low pressure regions from being formed along a circumference of a shaft due to lubricating fluid being concentrated on a dynamic pressure generation groove at the time of initial spindle motor operation.

According to an aspect of the present invention, there is provided a hydrodynamic bearing assembly including: a shaft; a sleeve having a shaft hole formed therein so that the shaft is rotatably inserted thereinto; and first and second dynamic pressure generation grooves provided in at least one of an outer surface of the shaft and an inner surface of the sleeve and having a herringbone pattern including repeated V-shaped portions in which upper and lower wings are provided so as to generate dynamic pressure in a lubricating fluid filling a bearing clearance formed between the shaft and the sleeve at the time of rotation of the shaft; wherein the first dynamic pressure generation groove has a V-shaped portion of which an upper wing is longer than a lower wing among a plurality of V-shaped portions, and the second dynamic pressure generation groove is disposed below the first dynamic pressure generation groove in an axial direction and has a V-shaped portion of which a lower wing is longer than an upper wing among a plurality of V-shaped portions.

Upper and lower wings of remaining V-shaped portions, except for the V-shaped portions having a difference in length between the upper and lower wings among the plurality of V-shaped portions provided in the first and second dynamic pressure generation grooves may have the same length.

Fluid pressure generated in a downward axial direction by the first dynamic pressure generation groove at the time of the rotation of the shaft may be greater than fluid pressure generated in an upward axial direction by the second dynamic pressure generation groove.

The number of V-shaped portions provided in the first dynamic pressure generation groove and having a difference in length between the upper and lower wings thereof may be greater than that of V-shaped portions provided in the second dynamic pressure generation groove and having a difference in length between the upper and lower wings thereof.

A difference in length between the upper and lower wings of the V-shaped portion provided in the first dynamic pressure generation grooves is larger than a difference in length between the upper and lower wings of the V-shaped portion provided in the second dynamic pressure generation groove.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
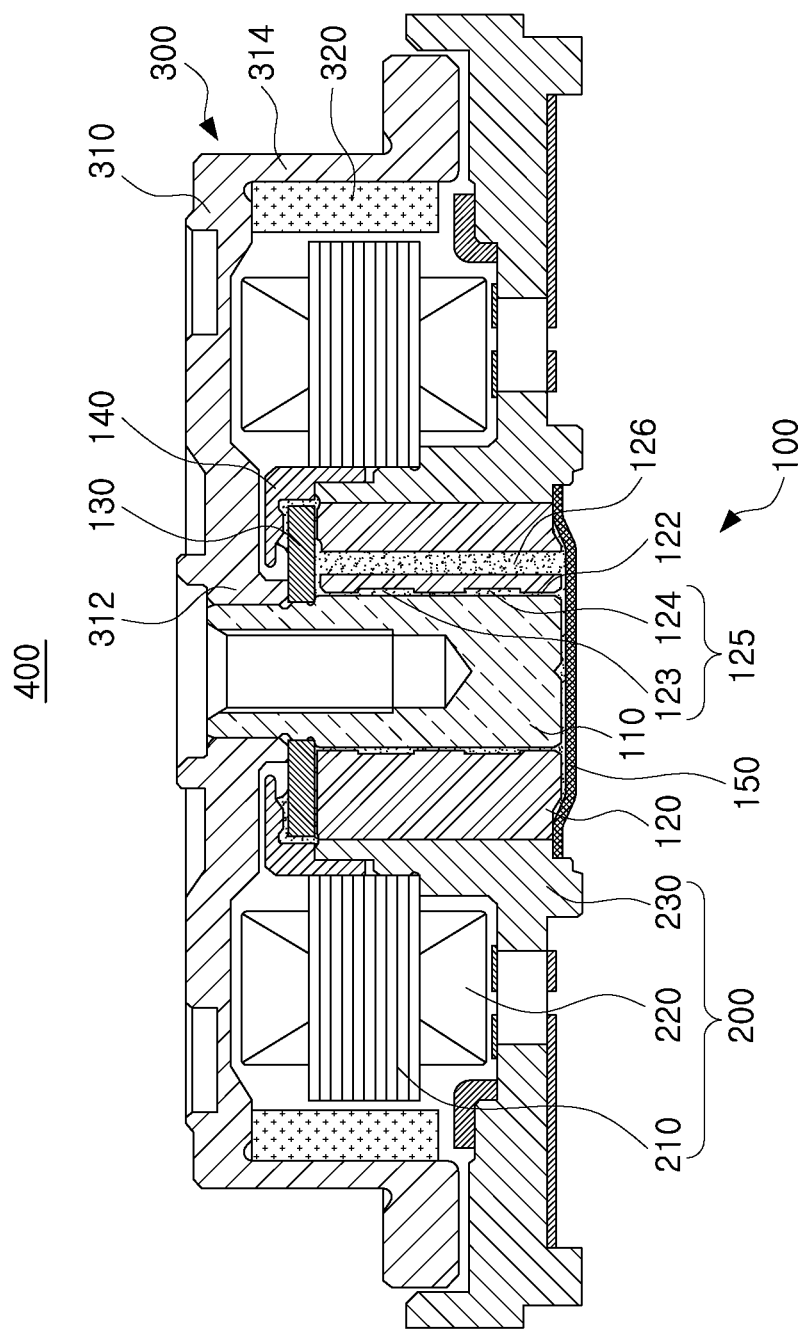
FIG. 1 is a schematic cross-sectional view showing a motor device including a hydrodynamic bearing assembly according to an embodiment of the present invention.

Embodiments of the present invention will now be described in detail with reference to the accompanying drawings. However, it should be noted that the spirit of the present invention is not limited to the embodiments set forth herein and that those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, like reference numerals will be used to designate like components having similar functions throughout the drawings within the scope of the present invention.

FIG. 1 is a schematic cross-sectional view showing a motor device including a hydrodynamic bearing assembly according to an embodiment of the present invention.

Referring to FIG. 1, a motor device 400 according to an embodiment of the present invention may include a hydrodynamic bearing assembly 100, a stator 200, and a rotor 300.

Specific embodiments of the hydrodynamic bearing assembly 100 will be described in detail below, and the motor device 400 according to the embodiment of the present invention may have all the specific characteristics of each embodiment of the hydrodynamic bearing assembly 100.

The stator 200 may be a fixed structure that includes a winding coil 220 generating electromagnetic force having a predetermined magnitude at the time of the application of power and a plurality of cores 210 having the winding coil 220 wound therearound.

The core 210 may be fixedly disposed on an upper portion of a base 230 on which a printed circuit board (not shown) having circuit patterns printed thereon is provided, and a plurality of coil holes having a predetermined size may penetrate an upper surface of the base 230 corresponding to the winding coil 220 in order to expose the winding coil 220 downwardly. The winding coil 220 is electrically connected to the printed circuit board (not shown) such that external power may be supplied thereto.

Here, the base 230 is a component configuring the stator 200 and the hydrodynamic bearing assembly 100 to be described below. Therefore, a detailed description thereof will be provided below.

The rotor 300 may be a rotating structure rotatably provided with respect to the stator 200 and may include a rotor case 310 having an annular ring shaped magnet 320 provided on an inner peripheral surface thereof, and the annular ring shaped magnet 320 corresponds to the core 210 while having a predetermined interval therebetween.

In addition, the magnet 320 may be a permanent magnet generating magnetic force having a predetermined strength by alternately magnetizing an N pole and an S pole thereof in a circumferential direction.

Here, the rotor case 310 may include a fixed part 312 press-fitted onto an upper end of a shaft 110 to thereby be fixed thereto and a magnet support part 314 extended from the fixed part 312 in an outer diameter direction and bent in a downward axial direction to support the magnet 320 of the rotor 300.

Figure 2:
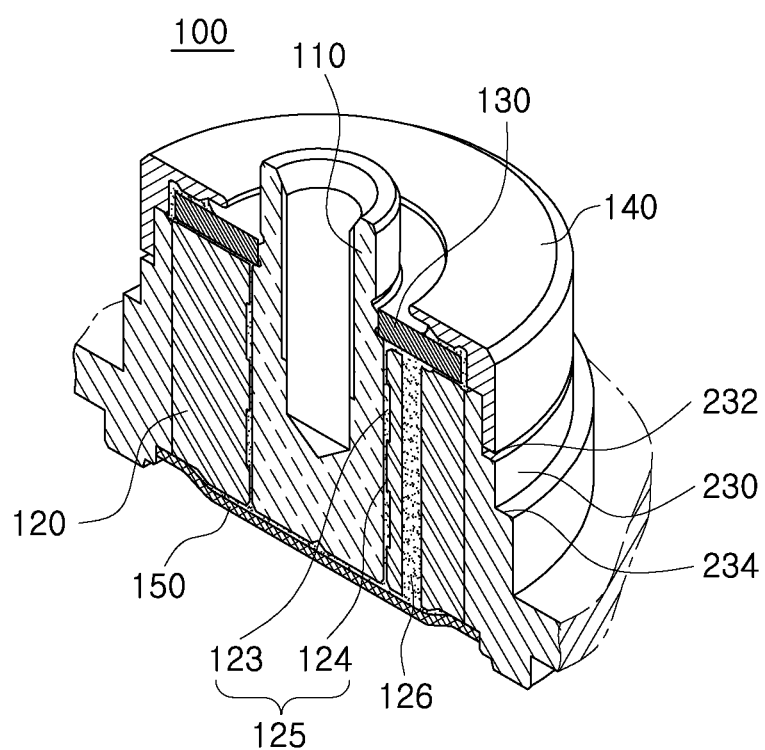
FIG. 2 is a schematic cut-away perspective view showing the hydrodynamic bearing assembly according to an embodiment of the present invention.
Figure 3:
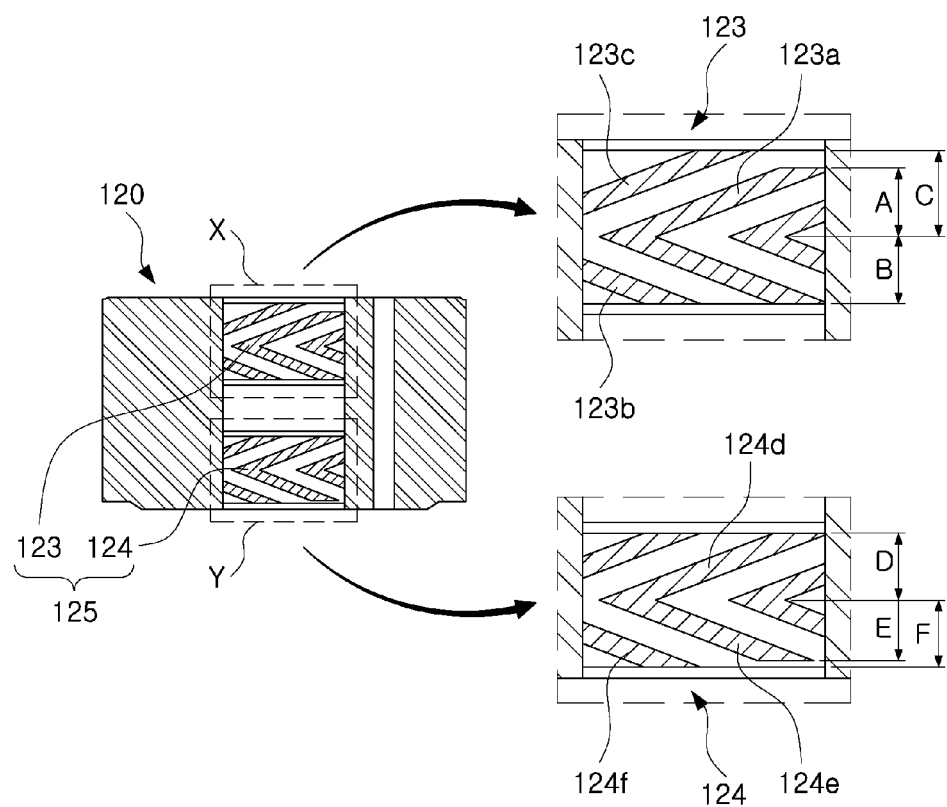
FIG. 3 is a cross-sectional view of a sleeve according to an embodiment of the present invention.

FIG. 2 is a schematic cut-away perspective view showing the hydrodynamic bearing assembly according to the embodiment of the present invention; and FIG. 3 is a cross-sectional view of a sleeve according to the embodiment of the present invention.

The hydrodynamic bearing assembly 100 according to the embodiment of the present invention may include the shaft 110, a sleeve 120, a thrust plate 130, a sealing cap 140, and the base 230.

Terms with respect to directions will be first defined. As viewed in FIGS. 2 and 3, an axial direction refers to a vertical direction based on the shaft 110 and an outer diameter direction or an inner diameter direction refers to a direction toward an outer edge of the rotor 300 based on the shaft 110 or a direction toward the center of the shaft 110 based on the outer edge of the rotor 300.

The sleeve 120 may support the shaft 110 such that an upper end of the shaft 110 protrudes upwardly in the axial direction and may be formed by forging Cu or Al or sintering Cu—Fe-based alloy powders or SUS-based powders.

Here, the shaft 110 may be inserted into a shaft hole 122 of the sleeve 120 so as to have a micro clearance (a bearing clearance) therewith, and the micro clearance is filled with lubricating fluid. The rotation of the rotor 300 may be more smoothly supported by a dynamic pressure generation groove 125 formed in at least one of an outer surface of the shaft 110 and an inner surface of the sleeve 120.

The dynamic pressure generation groove 125 may be formed in the inner surface of the sleeve 120, which is an inner portion of the shaft hole 122 of the sleeve 120, and generate pressure so that the shaft 100 is biased to one side at the time of rotation thereof.

However, the dynamic pressure generation groove 125 is not limited to being formed in the inner surface of the sleeve 120 as described above, but may also be formed in the outer surface of the shaft 110. In addition, the number of dynamic pressure generation grooves 125 is not limited.

In addition, according to the embodiment of the present invention, the dynamic pressure generation groove 125 may include first and second dynamic pressure generation grooves 123 and 124 having a herringbone pattern including repeated V-shaped portions in which upper wings 123a, 123c, and 124d and lower wings 123b, 124e, and 124f are provided so as to generate dynamic pressure in the lubricating fluid filling the bearing clearance formed between the shaft 110 and the sleeve 120 at the time of rotation of the shaft 110.

The dynamic pressure generation grooves 125 may be formed as a pair in upper and lower portions of the shaft 110 in the axial direction to allow the shaft 110 to rotate while being accurately centered of the shaft 110.

Here, the first dynamic pressure generating groove 123 may have a V-shaped portion of which the upper wing 123c is longer than the lower wing 123b among a plurality of V-shaped portions, and the second dynamic pressure generation groove 124 may be disposed below the first dynamic pressure generation groove 123 in the axial direction and have a V-shaped portion of which the lower wing 124f is longer than the upper wing 124d among a plurality of V-shaped portions. In addition, upper wings and lower wings of remaining V-shaped portions, except for the V-shaped portions having a difference in length between the upper and lower wings among the plurality of V-shaped portions provided in the first and second dynamic pressure generation grooves 123 and 124, may have the same length.

That is, in the case in which the shaft 110 rotates, fluid pressure may be generated in the downward axial direction by the first dynamic pressure generation groove 123 and may be generated in the upward axial direction by the second dynamic pressure generation groove 124 such that the fluid may not be discharged from a space between the first and second dynamic pressure generation grooves 123 and 124 at once. Therefore, when the spindle motor is operated, the generation of vibrations and noise in the spindle motor due to the discharging of the fluid from the space between the first and second dynamic pressure generation grooves 123 and 124 at once may be solved.

Further, the fluid pressure generated in the downward axial direction by the first dynamic pressure generation groove 123 at the time of the rotation of the shaft 110 may be greater than the fluid pressure generated in the upward axial direction by the second dynamic pressure generation groove 124, such that the shaft 110 may be floated at the time of the rotation thereof. In order to implement this difference in fluid pressure, the number of V-shaped portions provided in the first dynamic pressure generation groove 123 and having a difference in length between the upper and lower wings thereof may be greater than that of V-shaped portions provided in the second dynamic pressure generation groove 124 and having a difference in length between the upper and lower wings, or the difference in length between the upper and lower wings of the V-shaped portions provided in the first dynamic pressure generation groove 123 may be larger than the difference in length between the upper and lower wings of the V-shaped portions provided in the second dynamic pressure generation groove 124.

More specifically, two cases may be described by way of example. In the first case, the number of V-shaped portions having the difference in length between the upper and lower wings in the first dynamic pressure generation groove 123 may be the same as that in the second dynamic pressure generation groove 124 and the fluid pressure may be adjusted by the difference in length between the wings. In the second case, the number of V-shaped portions having the difference in length between the upper and lower wings in the first dynamic pressure generation groove 123 may be different from that in the second dynamic pressure generation groove 124 (In this case, the difference in lengths between the wings may be the same as one another).

The first case may be implemented when equations such as C−B>F−D, A=B, and D=E are satisfied. In addition, the second case may be implemented when equations such as C−B=F−D, A=B, and D=E are satisfied and the number of V-shaped portions having the difference in length between the upper and lower wings in the first dynamic pressure generation groove 123 is larger than that in the second dynamic pressure generation groove 124.

The sleeve 120 may include a bypass channel 126 formed therein in order to allow upper and lower portions thereof to communicate with each other to disperse pressure in the lubricating fluid in an inner portion of the hydrodynamic bearing assembly 100, thereby maintaining uniform pressure, and may move air bubbles, or the like, present in the inner portion of the hydrodynamic bearing assembly 100 so as to be discharged by circulation.

The thrust plate 130 may be disposed on an upper portion of the sleeve 120 in the axial direction, and include a hole corresponding to a cross section of the shaft 110 at the center thereof such that the shaft 110 may be inserted into the hole.

Here, the thrust plate 130 may be separately manufactured and then coupled to the shaft 110. However, the thrust plate 130 may be formed integrally with the shaft 110 at the time of manufacturing thereof and may rotate together therewith at the time of the rotation of the shaft 110.

In addition, the thrust plate 130 may include a thrust dynamic pressure groove formed in an upper surface thereof, wherein the thrust dynamic pressure groove provides thrust dynamic pressure to the shaft 110.

The thrust dynamic pressure groove is not limited to being formed in the upper surface of the thrust plate 130 as described above, but may also be formed in an inner peripheral surface of the sealing cap 140 to be described below, corresponding to the upper surface of the thrust plate 130.

The sealing cap 140 may be press-fitted onto an upper portion of the thrust plate 130 to allow the lubricating fluid to be sealed between the thrust plate 130 and the sealing cap 140. An outer peripheral surface of the base 230 to be described below may be inserted into the sealing cap 140 to be supported thereby.

The sealing cap 140 may include a protrusion part formed on a lower surface thereof in order to seal the lubricating fluid, which uses a capillary phenomenon in order to prevent the lubricating fluid from leaking to the outside at the time of the driving of the motor.

In an inner peripheral surface of the sealing cap 140, a portion thereof contacting the base 230 may be larger than a portion thereof contacting an outer peripheral surface of the thrust plate 130 so as to be seated on the upper portion of the sleeve 120 in the axial direction.

This is to allow an outer peripheral surface of the sealing cap 140 and an outer peripheral surface of the base 230 to coincide so as to be disposed in parallel with one another and is consequently provided to stably press-fit the core 210 having the coil 220 wound therearound onto the outer peripheral surfaces of the sealing cap 140 and the base 230.

Therefore, the outer peripheral surface of the base 230 may conform to a shape of the sealing cap 140.

Here, the sealing cap 140 may be press-fitted onto the outer peripheral surface of the base 230, such that a diameter of the sleeve 120 may be substantially reduced.

This may reduce an inner diameter of the core 210 press-fitted into the base 230 to naturally increase a teeth length of the core 210 around which the coil 220 is wound.

Therefore, turns of the coil 220 wound around the core 210 may increase, whereby performance and dynamic stability of the hydrodynamic bearing assembly 100 may be improved.

The base 230 may be press-fitted onto the outer peripheral surface of the sleeve 120 to thereby be fixed thereto and may include the core 210 inserted thereinto, wherein the core 210 has the coil 220 wound therearound. In addition, the base 230 may be connected to the sleeve 120 by applying an adhesive to the inner surface of the base 230 or the outer surface of the sleeve 120.

The outer peripheral surface of the base 230 may include two-stage steps having a diameter increasing in the outer diameter direction and include the sealing cap 140 and the core 210 each press-fitted onto portions thereof at which the steps are formed.

A first step part 232 may allow the outer peripheral surface of the sealing cap 140 to coincide with the outer peripheral surface of the base 230 in contact with the core 210 so as to be disposed in parallel with one another and stably fix the sealing cap 140 to the base 230.

In addition, a second step part 234 may fixedly support the core 210. A length of the second step part 234 protruding in the outer diameter direction is not limited as long as the core 210 may be stably fixedly supported.

Therefore, since the outer peripheral surface of the base 230 has different diameters and the sealing cap 140 is press-fitted onto the outer peripheral surface of the base 230, the diameter of the sleeve 120 may be reduced as compared to the case in which the sealing cap 140 is press-fitted onto the sleeve 120. As a result, the teeth length of the core 210 may be increased.

A base cover 150 may be coupled to the sleeve 120 at a lower portion of the sleeve 120 in the axial direction, having a clearance therewith, and an outer diameter of the base cover 150 may be larger than that of the sleeve 120.

The base cover 150 may receive the lubricating fluid in the clearance between the sleeve 120 and the base cover 150 to serve as a bearing supporting a lower surface of the shaft 110.

As set forth above, according to the embodiments of the present invention, a flow of the fluid generated in the hydrodynamic bearing assembly is adjusted so as not to generate uneven pressure, such that the shaft rotating in a state in which it is fitted into the sleeve may be accurately centered, whereby vibrations and the noise generated in the motor may be reduced.

While the present invention has been shown and described in connection with the embodiments, it will be apparent to those skilled in the art that modifications and variations can be made without departing from the spirit and scope of the invention as defined by the appended claims.

What is claimed is:
1. A hydrodynamic bearing assembly comprising:
a shaft;
a sleeve having a shaft hole formed therein so that the shaft is rotatably inserted thereinto;
first dynamic pressure generation grooves provided in at least one of an outer surface of the shaft and an inner surface of the sleeve and having a herringbone pattern including repeated V-shaped grooves in which upper and lower wings are provided so as to generate dynamic pressure in a lubricating fluid filling a bearing clearance formed between the shaft and the sleeve at the time of rotation of the shaft; and second dynamic pressure generation grooves provided in at least one of an outer surface of the shaft and an inner surface of the sleeve and having a herringbone pattern including repeated V-shaped grooves in which upper and lower wings are provided so as to generate dynamic pressure in a lubricating fluid filling a bearing clearance formed between the shaft and the sleeve at the time of rotation of the shaft, wherein the first dynamic pressure generation grooves have a part of the V-shaped grooves of which the upper wing is longer than a lower wing among a plurality of V-shaped grooves, and the second dynamic pressure generation grooves are disposed below the first dynamic pressure generation grooves in an axial direction and have a part of the V-shaped grooves of which the lower wing is longer than an upper wing among a plurality of V-shaped grooves.

2. The hydrodynamic bearing assembly of claim 1, wherein upper and lower wings of remaining V-shaped grooves, except for the V-shaped grooves having a difference in length between the upper and lower wings among the plurality of V-shaped grooves provided in the first and second dynamic pressure generation grooves have the same length.

3. The hydrodynamic bearing assembly of claim 1, wherein fluid pressure generated in a downward axial direction by the first dynamic pressure generation grooves at the time of the rotation of the shaft is greater than fluid pressure generated in an upward axial direction by the second dynamic pressure generation grooves.

4. The hydrodynamic bearing assembly of claim 1, wherein a difference in length between the upper and lower wings of the V-shaped grooves provided in the first dynamic pressure generation grooves is larger than a difference in length between the upper and lower wings of the V-shaped grooves provided in the second dynamic pressure generation grooves.

5. A hydrodynamic bearing assembly comprising:
a shaft;
a sleeve having a shaft hole formed therein so that the shaft is rotatably inserted thereinto;

first dynamic pressure generation grooves provided in at least one of an outer surface of the shaft and an inner surface of the sleeve and having a herringbone pattern including repeated V-shaped grooves in which upper and lower wings are provided so as to generate dynamic pressure in a lubricating fluid filling a bearing clearance formed between the shaft and the sleeve at the time of rotation of the shaft; and second dynamic pressure generation grooves provided in at least one of an outer surface of the shaft and an inner surface of the sleeve and having a herringbone pattern including repeated V-shaped grooves in which upper and lower wings are provided so as to generate dynamic pressure in a lubricating fluid filling a bearing clearance formed between the shaft and the sleeve at the time of rotation of the shaft, wherein the first dynamic pressure generation grooves have a part of the V-shaped grooves of which the upper wing is longer than the lower wing among a plurality of V-shaped grooves, the second dynamic pressure generation grooves are disposed below the first dynamic pressure generation grooves in an axial direction and have a part of the V-shaped grooves of which the lower wing is longer than the upper wing among a plurality of V-shaped grooves, and the number of V-shaped grooves provided in the first dynamic pressure generation grooves and having a difference in length between the upper and lower wings thereof is greater than that of V-shaped grooves provided in the second dynamic pressure generation grooves and having a difference in length between the upper and lower wings thereof.

* * * * *